April 28, 1964  J. J. GOODRICH ETAL  3,131,287
DEVICE FOR AUTOMATIC SELECTION OF WELDING SCHEDULES
Filed Dec. 12, 1961

INVENTORS
John J. Goodrich &
BY Thomas W. Shearer, Jr.

C. E. James
ATTORNEY

United States Patent Office

3,131,287
Patented Apr. 28, 1964

3,131,287
DEVICE FOR AUTOMATIC SELECTION OF
WELDING SCHEDULES
John J. Goodrich, Warren, and Thomas W. Shearer, Jr., Auburn Heights, Mich., assignors to General Motors Corporation, Detroit, Mich., a corporation of Delaware
Filed Dec. 12, 1961, Ser. No. 158,840
7 Claims. (Cl. 219—89)

This invention relates generally to welding apparatus and more particularly to a control device for resistance welding apparatus adapted to automatically establish different welding schedules as to time and current in accordance with variation in the metal thickness placed between welding electrodes.

With resistance welding apparatus for multi-plate seams of different total thickness, the welding time and/or current and sometimes pressure are normally varied to obtain optimum welding results. For this purpose, a thickness probe or operator actuated switch normally energizes appropriate electrical circuits adapted to provide a predetermined schedule of such variables for properly welding the particular metal thickness. In the past, such schedule selectors have generally required manual adjustment for electrode wear and resetting thickness probe control elements for different weld thicknesses.

The invention contemplates an improved resistance welding control device which is automatically operable to select a proper schedule of welding variables in accordance with the thickness of metal placed between the welding electrodes, which features means for automatically accommodating and compensating for electrode tip wear, which provides for substantial electrode overtravel without resetting or requiring subsequent resetting of the several control elements, and which includes means for quickly releasing and resetting the several control elements to accommodate electrode replacement or welds of different thicknesses.

Figure 1:
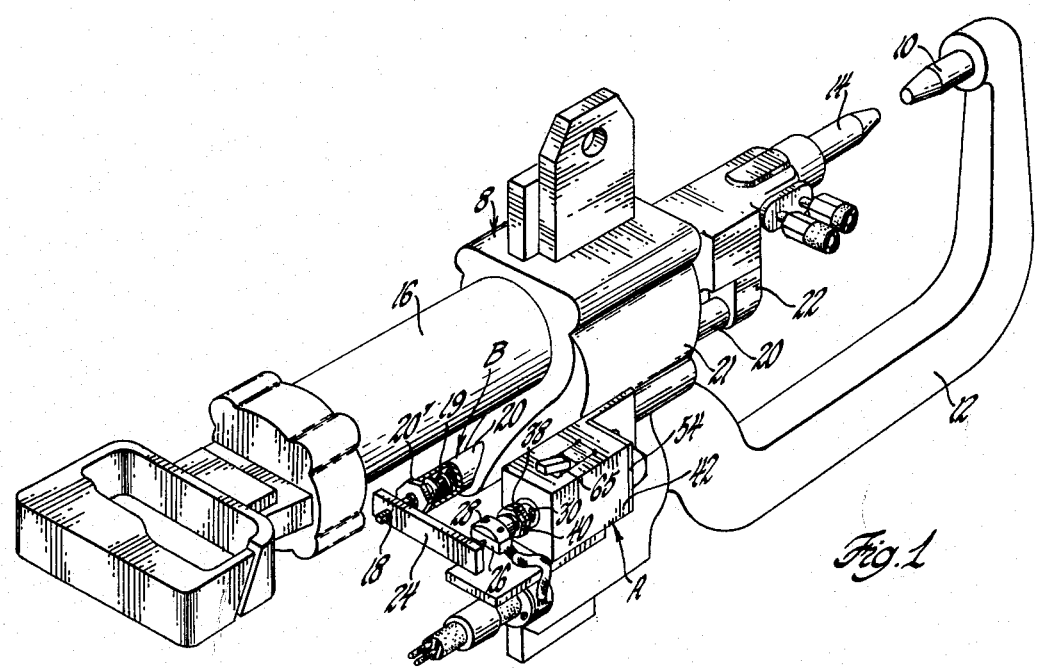
Figure 2:
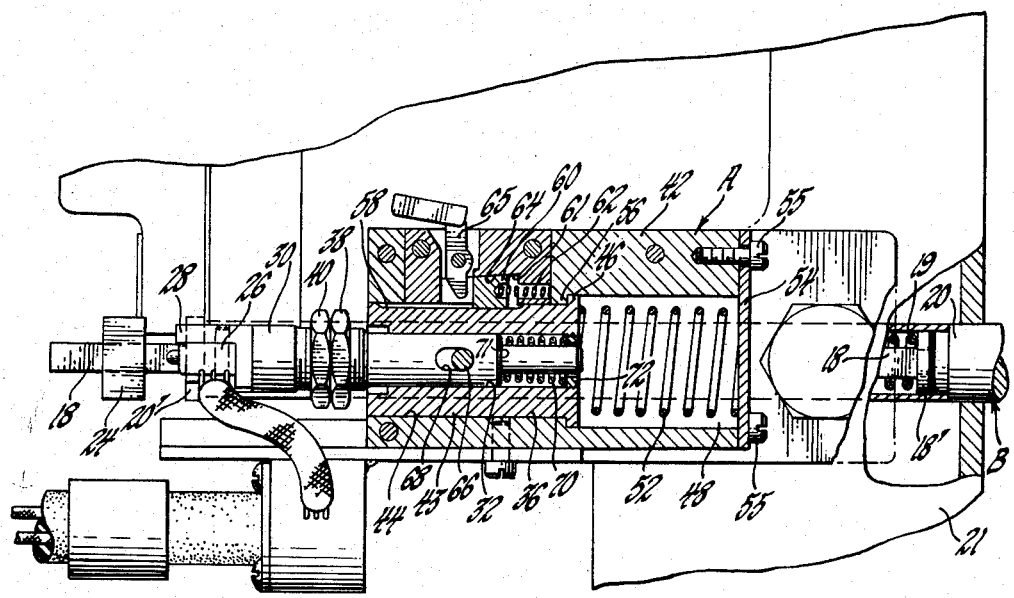

The foregoing and other objects, advantages and features of the invention will be apparent from the following description of a preferred illustrative embodiment, having reference to the accompanying drawing in which:

FIGURE 1 is a perspective view of a resistance welding gun incorporating a schedule selecting control device in accordance with the invention; and FIGURE 2 is an enlarged fragmentary view showing the control device of FIGURE 1 with portions thereof broken away and the remaining portions being shown in sectional detail.

Referring now more particularly to FIGURE 1, the resistance welding gun is indicated generally by the reference numeral 8 and includes a fixed electrode 10 carried by a U-shaped support arm 12 and a movable electrode 14. The electrode 14 is actuated by a reciprocating fluid pressure motor 16 toward engagement with the fixed electrode and normally contacts the multi-plate seam placed between the electrodes for welding. The schedule selector of the invention includes a swicth unit A mounted on the side face of the gun and a metal thickness probe assembly B. The probe assembly B is mounted by the gun frame for movement with the electrode 14 and adapted to actuate the switch unit A when a minimum metal thickness is placed between the electrodes.

The probe assembly B includes a rod 18 which is slidably mounted in and projects from one end of a guide sleeve 20. The sleeve 20 is in turn slidably mounted in the gun frame 21 and connected at 22 for movement with the electrode 14. A spring 19 embraces the rod within the guide sleeve 20 and is compressively interposed between an end flange 18' on the rod and a crosshead bearing gland fitting 20' threaded within the open end of the guide sleeve. The guide sleeve and the fitting 20' slidably embrace the rod 18 which is normally maintained by the spring 19 in electrode following engagement at its flanged end with the closed end of the sleeve 20. A switch control arm 24 is adjustably mounted on the projecting end of the rod 18 so as to engage and actuate the schedule selecting switch unit A.

The switch unit A comprises a snap action switch 26 mounted on a notched platform 28 formed integrally of one end of a rod 30. The rod 30 is reciprocably mounted within a bore 32 extending coaxially of a support sleeve 36. Two nuts 38 and 40 are threadably mounted and locked in adjusted position on the rod intermediate the sleeve and the switch mounting platform 28. These nuts are preferably adjusted to provide a locked setup dimension between the opposing faces of the sleeve and the adjacent nut substantially equal to the mean difference in the metal thicknesses to be welded. The rod supporting sleeve 36 is reciprocably mounted within a housing member 42 suitably secured to the side face of the welding gun.

The sleeve 36 has a reduced diameter portion 43 slidable within a bore 44 extending axially of the housing from its switch adjacent end and a spring seating limit flange 46 at its opposite end. The flange 46 is spacedly embraced by a counterbored spring chamber 48 which extends coaxially of the bore 44 from the opposite end of the housing member. A spring 52 is compressively mounted within the chamber 48 between a plate 54 secured at 55 to the housing and closing the open end of the counterbored housing chamber and the spring seating flange 46 of the rod supporting sleeve. The spring 52 thus tends to bias the flange 46 toward abutment with a radial shoulder 56 defined by the stepped diameters of the housing bore and counterbore.

The reduced diameter portion of the sleeve 36 has a longitudinally extending groove or flat 58. This flat or groove is slidably and frictionally engageable by a trapezoidal wedge member 60 mounted for movement longitudinally of the sleeve 36 within a housing defined recess 61 opening on the bore 44. The member 60 restrains the sleeve from rotation relative to the housing and is normally biased by a spring 62 into wedged frictional locking engagement between an inclined housing surface 64 and the flat surface on the sleeve. A lever 65 is pivotally supported by an extends outwardly of the housing. This lever is manually operable to disengage the wedge member from sleeve locking engagement and thus permits resetting or longitudinal adjustment of the rod supporting sleeve relative to the housing. The mating inclined surfaces of the wedge and housing members also permit the sleeve 36 to be adjusted automatically to the left, as shown in the several figures, from an initially locked position. Such adjustment is initiated by overtravel of the switch actuating thrust which, when applied directly to the sleeve, disengages the wedge member and effects such sleeve movement. Upon removal of such adjustment effecting thrust, the wedge member frictionally locks the sleeve 36 in its adjusted longitudinal position against the biasing action of the spring 52.

A pin 66 extends diametrically of the sleeve 36 and slidably engages a slot 68 extending longitudinally of the switch supporting rod 30. This pin-and-slot connection limits longitudinal movement and prevents rotation between the rod and sleeve. The end of the rod mounted within the sleeve is of reduced diameter forming an internal spring guide and a spring seating shoulder 71. A spring 70 is compressively interposed between the spring seating shoulder on the rod and a ring 72 slidably embracing the spring guide rod portion and mounted in and closing the open end of the bore 32. The spring 70 normally maintains the rod 30 in slot-limited engagement with the pin 66 but permits limited switch actuating overtravel which is normally equal to the thickness differential dimension adjustably established between the sleeve and the adjacent rod threaded nut. The deflection characteristics or rates of the several springs are preferably selected so that switch actuating electrode following overtravel of the rod 18 and of the arm 24 is sequentially accommodated by the springs 70, 52, and 19 in that order.

During welding operation, both electrodes are subjected to tip wear over a period of time. When welding the minimum metal thickness, such tip wear results in switch actuating overtravel of the arm 24. This overtravel is accommodated by reciprocation of the switch supporting rod 30 within the limits of the setup dimension and/or of the compressive travel of the spring 70. Further tip wear overtravel beyond these limits is transmitted directly through the switch mounting platform and the limit nut 38 to the rod mounting sleeve 36. As previously indicated, such movement automatically resets the locked position of the sleeve with respect to the housing 42.

When the operator notes overtravel induced reciprocation of the switch and its supporting rod, the switch unit may be automatically reset to compensate for tip wear by actuating the fluid pressure motor of the welding gun 8 without metal between the electrode tips. Such actuation of the gun results in an initial overtravel of the switch actuating arm 24 equal to the difference in the metal thicknesses, the lost motion setup dimension provided between the switch mounting platform 24 and the limit nut 38. Subsequent further overtravel corresponds to the amount of tip wear and is transmitted directly to and shifts the rod supporting sleeve 36 to the left resetting its switch mounting position relative to the housing.

To reset the gun for different metal thicknesses or after replacing electrodes, the level 65 is actuated to release the sleeve locking wedge. This causes the spring 52 to carry the sleeve flange 46 into limiting abutment with the housing shoulder 56. After adjusting the switch actuating arm relative to the electrode following rod and the limit nuts 38, 40 with respect to the sleeve in accordance with any changes in metal thickness, the gun is then actuated without metal between the electrode tips. As before, such actuation of the gun automatically resets the snap switch mounting position of the sleeve 36 for further welding operation.

While the foregoing description has been limited to one illustrative embodiment, various changes and modifications might be made therein without departing from the spirit and scope of the invention as defined in the following claims.

We claim:

1. A circuit control mechanism for a resistance welder including electrodes movable into current transmitting contact with multi-plate metal seams of different thicknesses placed therebetween for welding, said control mechanism comprising a switch operable to selectively energize alternative welding schedule establishing control circuits, a switch actuating member operably connected and mounted for movement with one electrode and movable therewith into actuating engagement with said switch, a first switch supporting member, means reciprocably mounting said first switch supporting member for limited movement in spaced relation to said switch actuating member, a first spring means normally biasing said first switch supporting member toward said switch actuating member, means normally operable to lock said first switch supporting member in an adjusted position against movement toward said switch actuating member by the biasing action of said first spring means and operable to release said first switch supporting member for adjustment away from said switch actuating member to a newly adjusted position maintainable by said lock means against the biasing action of said first spring means, a second switch supporting member reciprocably mounted for a limited range of movement relative to and projecting outwardly of said first switch supporting member toward said switch actuating member, a second spring means normally biasing said second switch supporting member outwardly of the first switch supporting member within the limited range of movement permitted therebetween, said second switch supporting member mounting said switch for engagement with said switch actuating member and said switch actuating member being operable upon actuation of said switch to transmit further electrode movement directly to said second switch supporting member, and cooperating abutment means carried by said switch supporting members and engageable to limit reciprocable movement between said switch supporting members, said abutment means being adjustable to establish an overtravel limiting dimension between said switch supporting members substantially equal to the mean difference in the alternative thicknesses of the multi-plate seams to be welded between said electrodes whereby actuation of said one electrode into engagement with the other electrode without a metal seam therebetween causes overtravel limiting engagement of said abutment means thereby actuating said first switch supporting member against the biasing action of said first spring means to a new position compensating for electrode tip wear and maintainable by the lock means for subsequent operation of the associated welder.

2. Circuit control mechanism for resistance welding apparatus including two opposing electrodes, at least one of the electrodes being reciprocably mounted by said apparatus for movement toward engagement with the opposing electrode and means for selectively actuating said one electrode toward the opposing electrode to effect current transmitting welding contact of the opposing electrodes with seams of different thicknesses placed therebetween, said control mechanism comprising a first member mounted on the apparatus for reciprocable movement in spaced parallel relation to the relative movement between said electrodes, a first spring means normally biasing said first member oppositely from the seam contacting actuated movement of said one electrode, means normally operable to lock said first member in an adjusted position against movement by the biasing action of said first spring means and operable to adjust the locked position of said first member upon actuation of said first member against said first spring means, a second member mounted for a limited range of reciprocable movement relative to said first member and having one end projecting outwardly of the first member opposite to the actuated movement of said one electrode, a second spring means normally biasing said second member outwardly of the first member within the limited range of movement permitted therebetween, a switch mounted on the projecting end of said second member and operable to selectively energize alternative welding control circuits, a switch actuating member operable connected for movement with said one electrode and engageable to actuate said switch upon electrode movement sufficient to normally effect welding contact with a seam of minimum thickness and to transmit further movement of said one electrode directly to said second member, and abutment means normally adjustable and engageable to establish an overtravel dimension limiting reciprocable movement between said first and second members substantially equal to the mean difference in the alternative seam thicknesses to be welded between said electrodes, whereby actuation of said movable electrode without a seam between the electrodes causes said first member to be actuated by the resultant engagement of said abutment means against the biasing action of said first spring means to a new adjusted position maintainable by said lock means and compensating for electrode tip wear.

3. Circuit control mechanism comprising probe means including a first member selectively reciprocable in accordance with differences in the thicknesses of workpieces passing relative thereto, support means including a second member reciprocably mounted in parallel spaced relation to the movement of said first member, means for normally maintaining said second member in an adjusted position against movement away from the workpiece and operable to permit adjustment of the maintained position of said second member upon actuated movement toward said workpiece, a third member mounted for a limited range of reciprocable movement relative to said second member and having a portion projecting therefrom oppositely of the workpiece, and spring means normally biasing said third member outwardly of the second member within the limited range of movement permitted therebetween, a switch mounted on the projecting portion of said third member and selectively operable to establish alternate control circuits, said first member being engageable to actuate said switch upon movement corresponding to a minimum thickness of workpiece and in the absence of a workpiece being engageable with said third member to transmit further movement indicating such workpiece absence directly thereto, and abutment means carried by and normally adjustable for cooperating engagement limiting reciprocable movement between said second and third members to substantially the mean difference in workpiece thickness whereby reciprocation of said first member without an adjacent workpiece causes engagement of said abutment means and resultant actuation of said second member toward said workpiece to a newly maintained adjusted position compensating for thickness indicating variation in the reciprocable movement of the first member.

4. Circuit selecting control mechanism for resistance welding apparatus having means for actuating at least one electrode toward another electrode and normally into current transmitting contact with multi-plate metal seams of different thickness placed therebetween for welding, said control mechanism comprising a switch operable between opened and closed positions to selectively energize alternative welding current supply circuits, a switch actuating member operably connected for movement with said one electrode, support means mounting said switch on said apparatus for actuating engagement by said electrode connected member, said support means including a first support member reciprocably mounted in spaced relation to said switch actuating member for limited parallel movement relative thereto, a first spring means normally biasing said first support member toward said switch actuating member, means including a wedge member reciprocable to normally lock said first support member in an adjusted position against movement by said first spring means toward said switch actuating member and slidably disengageable by actuated adjustment of said first support member away from said switch actuating member against said first spring means to establish a new adjusted position, a second spring means normally biasing said wedge member toward locking engagement with said first support member, a second support member reciprocably mounted by and having one end projecting from said first support member toward said switch actuating member and mounting said switch for actuating engagement, means for limiting reciprocable movement between said first and second support members, a third spring means normally biasing said second support member outwardly of the first support member toward said switch actuating member within the movement permitted by said limiting means, said switch actuating member being directly engageable with the switch mounting end of said second support member to transmit movement of the movable electrode beyond that required for actuation of the switch directly to said second support member, and abutment means adjustably mounted on one of said support members and engageable to limit reciprocable movement of said second support member inwardly of the first support member, said abutment means being normally adjusted to establish a take-up dimension between said support members substantially equal to the mean difference in the alternative thicknesses of multi-plate seams to be welded between the electrodes whereby actuation of said movable electrode into engagement with the other electrode without a metal seam therebetween causes engagement of said abutment means and actuates said first support member away from said switch actuating member against said first spring means and slidably disengages said wedge member to effect a new adjusted position of said first support member thereby compensating said control mechanism for electrode wear.

5. In a circuit control mechanism for an apparatus as set forth in claim 4, means selectively operable to shift said wedge member to unlock said first support member and permit its return by said first spring means within the movement permitted by said support means whereby subsequent actuation of said movable electrode into engagement with the other electrode without a seam therebetween actuates said first support member to a new adjusted position compensating said control mechanism for dimensional changes in the electrodes.

6. In combination with resistance heating apparatus having alternate current controlling circuits and electrodes movable into current transmitting heating contact with multi-ply seams of different thickness, circuit controlling apparatus comprising a switch operable to selectively energize said alternate welding controlling circuits, a switch actuating member operably connected to and movable with one of said electrodes and having a laterally extending arm engageable to actuate said switch, a housing mounted on said welding apparatus and having a bore and a counterbore extending coaxially from opposite ends in parallel relation to the movement of said switch actuating member and defining a radial shoulder therebetween, a sleeve reciprocably mounted within said bore and having a flanged end embraced by said counterbore, a first spring means mounted within said counterbore and normally biasing said sleeve toward limiting engagement between said flange and shoulder, sleeve locking means including a tapered key member reciprocably mounted within a mating tapered recess in said housing and frictionally engageable to lock said sleeve in an adjusted position against movement toward said switch actuating arm by said first spring means and slidably disengageable from said sleeve to permit adjustment of the sleeve away from said switch actuating arm against said first spring means, a second spring means normally biasing said key member toward its sleeve locking engaged position, a switch supporting member reciprocably mounted within said sleeve and having one end thereof projecting outwardly toward said switch actuating arm, means for limiting reciprocable movement of said switch supporting member outwardly of said sleeve, a third spring means normally biasing said switch supporting member outwardly of the sleeve within the movement permitted by said limiting means, the projecting end of said switch supporting member defining a platform mounting said switch and said switch actuating arm being directly engageable with the projecting end of said platform upon actuation of said switch to transmit further electrode movement directly to said switch supporting member, and an adjustable abutment means engageable to limit reciprocable movement of said switch supporting member inwardly of said sleeve, said abutment means being normally adjusted to establish a limited take-up dimension substantially equal to the mean difference in the alternative thicknesses of the multi-ply seams whereby actuation of said movable electrode into engagement with the other electrode without a seam therebetween causes engagement of said abutment means and actuation of said sleeve to a newly adjusted locked position compensating for electrode tip wear.

7. In the combination set forth in claim 6, means for actuating the key member against said second spring means and out of frictional locking engagement with said sleeve thereby permitting said first spring means to bias said sleeve into limiting engagement between said flange and shoulder whereby subsequent actuation of said movable electrode without a seam therebetween actuates said sleeve member against the biasing action of said first spring means to effect a new frictionally locked position of said sleeve compensating for any dimensional change in the spacing of the electrodes.

References Cited in the file of this patent

UNITED STATES PATENTS

| | | |
|---|---|---|
| 1,848,905 | Rabbezzana | Mar. 8, 1932 |
| 3,049,607 | Stuben et al. | Aug. 14, 1962 |